United States Patent [19]
Colvin

[11] 3,878,677
[45] Apr. 22, 1975

[54] AUXILIARY TURBINE/COMPRESSOR SYSTEM FOR TURBINE ENGINE

[75] Inventor: Donald C. Colvin, North Palm Beach, Fla.

[73] Assignee: United Aircraft Corporation, East Hartford, Conn.

[22] Filed: Apr. 10, 1974

[21] Appl. No.: 459,823

[52] U.S. Cl. .............................. 60/39.14; 415/500
[51] Int. Cl. ........................ F02c 7/26; F03b 3/10
[58] Field of Search............ 60/39.14, 39.33, 39.07, 60/39.18 C; 415/500, 160, 163

[56] References Cited
UNITED STATES PATENTS

| | | | |
|---|---|---|---|
| 2,318,905 | 5/1943 | Traupel.......................... | 60/39.14 X |
| 2,608,054 | 8/1952 | Price.............................. | 60/39.14 |
| 2,671,635 | 3/1954 | Willi.............................. | 415/163 |
| 2,692,476 | 10/1954 | Schaal et al. ................ | 60/39.14 |
| 2,874,540 | 2/1959 | Esmeier et al................ | 60/39.14 X |
| 3,107,489 | 10/1963 | Palfreyman.................... | 60/39.14 |

Primary Examiner—C. J. Husar
Assistant Examiner—Thomas I. Ross
Attorney, Agent, or Firm—Jack N. McCarthy

[57] ABSTRACT

A gas turbine engine has incorporated therein an auxiliary turbine/compressor system providing for engine starting and providing compressed air for accessories during engine operation. A turbine/compressor unit is connected to the engine compressor for rotation therewith. For starting, compressed air is passed over the turbine/compressor unit utilizing it as a turbine, which thereby turns the compressor for starting while the air passing through the turbine/compressor unit then flows over the blades of the compressor into the burner. After starting, the compressor rotates the turbine/compressor unit and acting as a compressor it compresses ambient air and makes it available for use in driving air driven accessories. A valving system is provided to permit proper control of airflow. Variable position vanes are located at both ends of the turbine/compressor unit to control direction of airflow into and away from the unit as it is used as a turbine or compressor.

6 Claims, 2 Drawing Figures

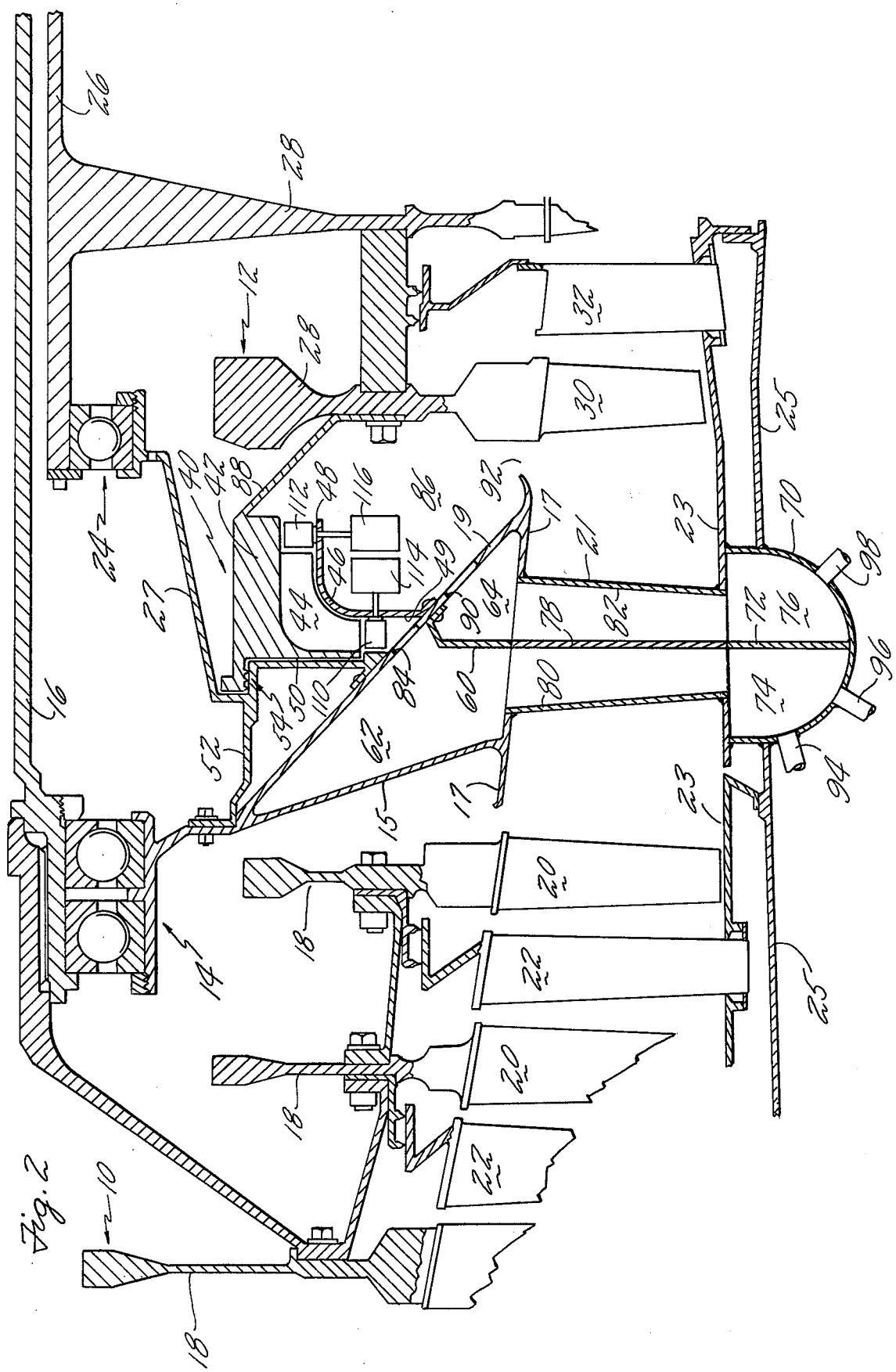

AUXILIARY TURBINE/COMPRESSOR SYSTEM FOR TURBINE ENGINE

The invention herein described was made in the course of work done, or under a contract, with the Department of the Air Force.

BACKGROUND OF THE INVENTION

This invention relates to devices for starting turbine engines providing compressed air for access operation. U.S. Pat. No. 2,692,476 discloses gas turbine engine air starting motor constituting an air supply mechanism.

SUMMARY OF THE INVENTION

A primary object of the present invention is to provide an improved device for providing for engine starting providing compressed air for accessories during engine operation.

In accordance with the present invention a turbine/compressor unit is connected to the engine compressor with air being directed to and away from said unit by valving means for providing the desired engine operation.

A further object of the present invention is to provide controllable vanes at both ends of the turbine/compressor unit for controlling direction of airflow into and away from the unit as it is used either as a turbine or compressor.

In accordance with another object of the invention a manifold is provided around the compressor for directing air into and receiving it out of the turbine compressor unit.

BRIEF DESCRIPTION OF THE DRAWINGS

FIG. 2 is an enlarged view of the auxiliary system showing the turbine/compressor unit and associated passage and valving means.

DESCRIPTION OF THE PREFERRED EMBODIMENT

Figure 1:
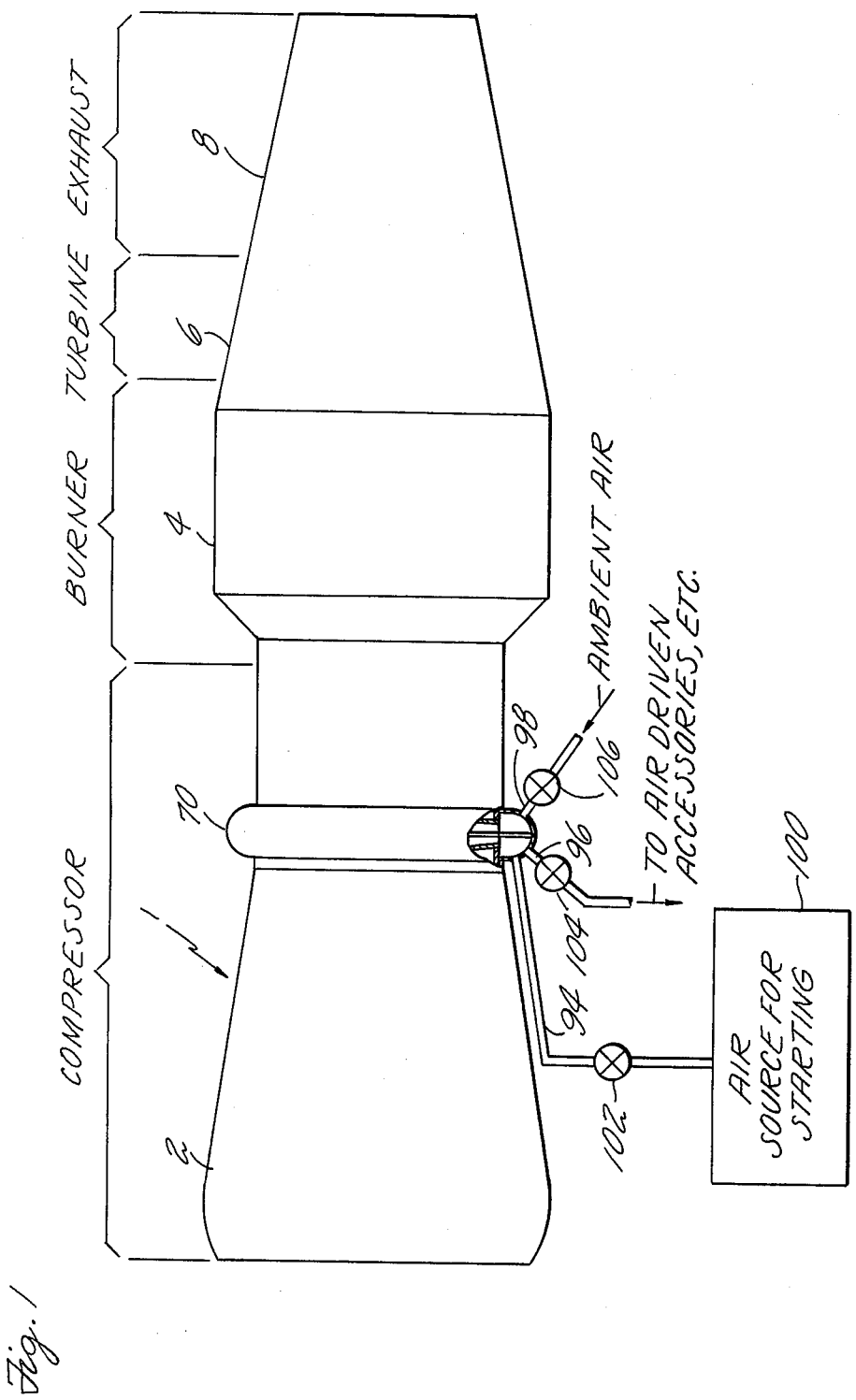
FIG. 1 is a view of a gas turbine engine with a section broken away to show the location of the auxiliary system.

FIG. 1 is a view of a jet engine 1 having a compressor section 2, burner section 4, turbine section 6 and exhaust section 8. An auxiliary turbine/compressor system is located in the compressor section. While the auxiliary turbine/compressor system can be used with any type of engine compressor desired, it is shown in an engine having a split compressor comprising a low pressure compressor 10 and a high pressure compressor 12. The low pressure compressor 10 is mounted for rotation on bearing means 14 fixed within the engine and the compressor 10 is connected by shaft means 16 to the low pressure turbine. The bearing means 14 is fixed to a first inwardly extending annular diaphragm member 15 which is connected at its outer edge to an inner wall 17 adjacent the compressor disk 18 of the last stage of the low pressure compressor. For added support, a second annular diaphragm member 19 connects the first inwardly extending diaphragm member 15 adjacent the bearing means 14 to the inner wall 17 at a point adjacent the disk 28 of the first stage of the high pressure compressor. A plurality of struts 21 connect the inner wall 17 to an outer wall 23 which is in turn fixedly mounted to the outer casing 25 of the engine. Some of these struts 21 can be hollow for a purpose to be hereinafter described. The compressor 10 comprises a unit made up of three compressor disks 18 having blades 20 around the outer periphery thereof. Vanes 22 are located axially between each set of blades.

The high pressure compressor 12 is mounted for rotation on bearing means 24 fixed within the engine and the compressor 12 is connected by shaft means 26 to the high pressure turbine. The compressor 12 is made up of two compressor disks having blades 30 around the outer periphery thereof. Vanes 32 are located axially between the two sets of blades. The compressor disk 18 of the last stage of the low pressure compressor is spaced from the disk 28 of the first stage of the high pressure compressor providing a space for the auxiliary turbine/compressor system.

The auxiliary turbine/compressor system comprises a turbine/compressor unit 40 with a rotor 42 having blades 44 which is mounted for rotation with the forward compressor disk 28 of the high pressure compressor 12. The rotor 42 is connected to the forward face of the forward compressor disk 28 by a conical drive member 88. An annular shroud member 46 fixed to diaphragm 19 is positioned adjacent the edges of the blades 44 and forms a passageway 48 with an inner surface of the rotor 42. This shroud 46 also forms a passageway 49 with an annular fixed wall 50. Annular fixed wall 50 is fixed at its outer end to annular diaphragm 19 and is fixed at its inner end to a cylindrical member 52. This cylindrical member 52 has one end attached to the inner end of diaphragm 15 while its other end is fixed to a conical member 27 which extends rearwardly to support bearing means 24. A seal means 54 is provided between the rotor 42 and cylindrical member 52.

An annular wall 60 extends between the diaphragm 19 and inner wall 17 dividing the area located between diaphragm 19, inner wall 17 and diaphragm 15 into two annular chambers 62 and 64. The inner end of the annular wall 60 is connected to the diaphragm 19 adjacent the connection of the shroud member 46 and the outer edge of the annular wall member 60 is connected to the inner wall 17 at a point adjacent the center of the struts 21 for a purpose to be hereinafter described.

An annular manifold 70 extends around the compressor section 2 with its inner ends connected to outer wall 23. The manifold 70 is also connected to the outer casing 25 of the engine for support. Manifold 70 has an annular wall 72 extending therearound dividing the manifold 70 into two annular compartments 74 and 76. One or more struts 21 are hollow permitting passage of air between the inner wall 17 and the outer wall 23. A wall 78 extends down the center of each hollow strut 21 connecting the outer edge of annular wall 60 which faces the interior of the hollow strut and the inner edge of the annular wall 72 which extends across the hollow part of a strut 21.

The wall 78 divides a hollow strut 21 into two passageways, a forward passageway 80 and a rearward passageway 82. Annular compartment 74 of manifold 70 is connected to chamber 62 by the forward passageway 80 and the annular compartment 76 of the manifold 70 is connected by the rear passageway 82 to the chamber 64.

An opening means 84 is located in diaphragm 19 to permit the passage of air between the annular chamber 62 and passageway 49. Passageway 48 opens into an annular chamber 86 formed between the forward face of the disk 28 of the first stage of the high pressure compressor, the interconnecting conical drive member 88, the shroud member 46 and the lower part of the diaphragm 19. An opening means 90 is located in diaphragm 19 to permit the passage of air between the annular chamber 64 and annular chamber 86. An opening 92 is located between the rear end of inner wall 17 and the forward face of the first stage rotor disk 28 of the high pressure compressor. The flow through these openings will be hereinafter described with the operation of the turbine/compressor system.

The manifold 70 has three conduits 94, 96 and 98 connected thereto for air flow control with the system. Conduits 94 and 96 extend to chamber 74 of the manifold 70 and conduit 98 extends to chamber 76.

Conduit 94 is for connection to an air source 100 for starting the engine. An "on-off" valve 102 is located in conduit 94 for proper control. Conduit 96 is for connection to air driven accessories. An "on-off" valve 104 is located in conduit 96 for proper control. For automatic operation, valves 102 and 104 can be operatively interconnected so that when one is open the other is closed. Conduit 98 is for receiving ambient air and an "on-off" valve 106 is located in said conduit for proper control. For automatic operation, valves 104 and 106 can be operatively interconnected so that they are both open or closed at the same time.

Movable vanes 110 are located in passageway 49 adjacent the ends of blades 44 and movable vanes 112 are located in passageway 48. Control means 114 and 116, respectively, are connected to said vanes for actuation thereof. This permits the turbine/compressor unit to be effectively used as both a turbine and compressor.

In operation, for starting, valve 102 is placed in an open position and valves 104 and 106 are placed in a closed position. This permits compressed air from an air source for starting 100 to flow through conduit 94 into annular compartment 74 of manifold 70 where it then flows through forward passageway 80 of vane 21 to annular chamber 62. The compressed air then flows through opening means 84 into passageway 49 where it flows over the vanes 110 into the blades 44 of the turbine/compressor unit 40. With the turbine/compressor unit 40 now acting as a turbine, it rotates the high pressure compressor 12 for starting. The air then flows from the turbine/compressor unit 40 through the vanes 112 into the annular chamber 86, since valve 106 is closed, the air in annular chamber 86 will flow through opening 92 over the blades 30 to pass into the burner section 4.

During engine operation, valve 102 is placed in a closed position and valves 104 and 106 are placed in an open position. This permits air to be pumped from conduit 98 to conduit 96. During engine operation the high pressure compressor 12 drives the turbine/compressor and unit 40 acts as a compressor pumping air from passageway 48 to passageway 49. Air is drawn by this pumping action through conduit 98 and valve 106 into annular compartment 76 of manifold 70 where it then flows through rearward passageway 82 of vane 21 to annular chamber 64. From there the air then flows through opening means 90 into annular chamber 86 where it encounters the passageway 48.

Compressed air from the turbine/compressor unit 40 acting as a compressor, then passes out passageway 49 through opening means 84 into annular chamber 62. From annular chamber 62 the air passes through the forward passage 80 of vane 21 into the annular compartment 74 of manifold 70 where it then flows through conduit 96 and valve 104 where it is then available for use in any manner desired. During operation, vanes 110 and 112 can be controlled to achieve the most desirable operation characteristics. While air-driven accessories have been mentioned it is noted that this air can also be used for turbine cooling and air assist nozzles.

Further, while conduit 98 is shown in FIG. 1 as receiving ambient air it is noted that the conduit 98 can receive air from other locations such as a compressor stage or within the duct of a ducted engine.

A specific construction using the device shown herein could have conduit 98 connected to a compressor stage while having a conduit 96 connected to a hollow turbine vane for directing air thereto for cooling.

I claim:

1. In combination a jet engine having compressor means, burner means, and turbine means, said compressor means having a compressor rotor with blades and a turbine/compressor unit connected thereto, said turbine/compressor unit having a rotor mounted for rotation with said rotor of said compressor means, said turbine/compressor unit rotor having blades therearound, shroud means covering the edges of the blades forming a passageway means for fluid flow through the blades of the rotor, said turbine/compressor unit having first opening means for permitting fluid into or out of said passageway means of the turbine/compressor unit, said turbine/compressor unit having a second opening means for permitting fluid into or out of said passageway means of the turbine/compressor unit, a first chamber having a connection with said first opening means, a second chamber having a connection with said second opening means, means for operating said turbine/compressor unit as a turbine comprising means for directing a compressed fluid to said first chamber for entry into said first opening means, said second chamber having third opening means for directing the fluid therein to the blades on said compressor rotor for entry into the burner, means for operating said turbine/compressor unit as a compressor comprising means for connecting said second chamber to a source of fluid, said first chamber having fourth opening means for directing the fluid therein to a device dependent on the compressed air.

2. A combination as set forth in claim 1 wherein said first opening means and second opening means have variable vanes therein to control airflow thereby.

3. A combination as set forth in claim 1 wherein a third chamber is connected to said second chamber, said first and third chambers being connected to an annular manifold around said engine, said annular manifold being divided into two annular sections, one of said annular sections being connected to said first chamber while the other section is connected to said third chamber, said means for directing a compressed fluid to said first chamber being connected to said annular section of said manifold connected to said first chamber, said means for connecting said second chamber to a source of fluid being connected to the other annular section of said manifold.

4. A combination as set forth in claim 1 wherein said compressor means includes a low pressure compressor and a high pressure compressor, said rotor being located between said compressors.

5. A combination as set forth in claim 4 wherein said rotor is connected to said high pressure compressor.

6. A combination as set forth in claim 3 wherein said annular section connected to said first chamber is also connected to an engine component dependent on compressed air.

* * * * *